(12) United States Patent  (10) Patent No.: US 7,918,033 B2
Held  (45) Date of Patent: Apr. 5, 2011

(54) METHOD FOR CORRECTING THE MEASURED VALUES OF A COORDINATE MEASURING MACHINE, AND COORDINATE MEASURING MACHINE

(75) Inventor: Tobias Held, Noerdlingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 12/762,052

(22) Filed: Apr. 16, 2010

(65) Prior Publication Data

US 2010/0319207 A1  Dec. 23, 2010

Related U.S. Application Data

(63) Continuation of application No. PCT/EP2008/007474, filed on Sep. 11, 2008.

(30) Foreign Application Priority Data

Oct. 19, 2007 (DE) .......................... 10 2007 051 054

(51) Int. Cl.
*G01B 21/04* (2006.01)
*G01B 5/008* (2006.01)

(52) U.S. Cl. ................ 33/503; 33/556; 33/502; 702/95; 702/168

(58) Field of Classification Search ............ 33/502–504, 33/545, 546, 549, 551, 553–556, 558, 559, 33/561, 567, 572, 573; 702/94, 95, 97, 150, 702/155, 168; 73/1.79

See application file for complete search history.

(56) References Cited

U.S. PATENT DOCUMENTS

| 5,138,563 | A | 8/1992 | Debitsch et al. |
| 5,594,668 | A | 1/1997 | Bernhardt et al. |
| 5,610,846 | A | 3/1997 | Trapet et al. |
| 6,776,023 | B2 | 8/2004 | Dubois |
| 7,318,284 | B2* | 1/2008 | McMurtry et al. ............... 33/503 |
| 2002/0029119 | A1 | 3/2002 | Lotze et al. |
| 2008/0295571 | A1* | 12/2008 | Takahama et al. ............. 73/1.89 |
| 2010/0014099 | A1* | 1/2010 | Christoph et al. ............. 356/602 |

FOREIGN PATENT DOCUMENTS

DE  43 25 602 C1  9/1994
DE  195 18 268 A1  11/1995

(Continued)

OTHER PUBLICATIONS

Werner Lotze, Messende Taster mit mehreren Freiheitsgraden, 1992, pp. 20-25.

*Primary Examiner* — Amy Cohen Johnson

(74) *Attorney, Agent, or Firm* — Harness, Dickey & Pierce, P.L.C.

(57) ABSTRACT

A coordinate measuring machine has a probe head, a calibrating body and an apparatus for recording and correcting measured values obtained by the probe head. A mechanical flexibility at predetermined points on the surface of the calibrating body is determined. The mechanical flexibility is stored in the apparatus in the form of a data record. The calibrating body is scanned point by point by means of the probe head in order to obtain the measured values. Thereafter, the probe head is calibrated by correcting the measured values using the data record. A similar approach can also be used on workpieces having a known mechanical flexibility.

10 Claims, 2 Drawing Sheets

FOREIGN PATENT DOCUMENTS

| | | |
|---|---|---|
| DE | 44 36 507 A1 | 4/1996 |
| DE | 198 05 892 A1 | 12/1998 |
| DE | 198 09 589 A1 | 9/1999 |
| DE | 101 24 493 A1 | 11/2001 |
| DE | 101 53 049 B4 | 5/2003 |
| DE | 101 57 174 A1 | 6/2003 |
| DE | 10 2004 007 968 A1 | 9/2005 |
| DE | 20 2005 013 544 U1 | 12/2005 |
| DE | 601 18 701 T2 | 4/2007 |
| EP | 0 438 095 B1 | 7/1991 |

* cited by examiner

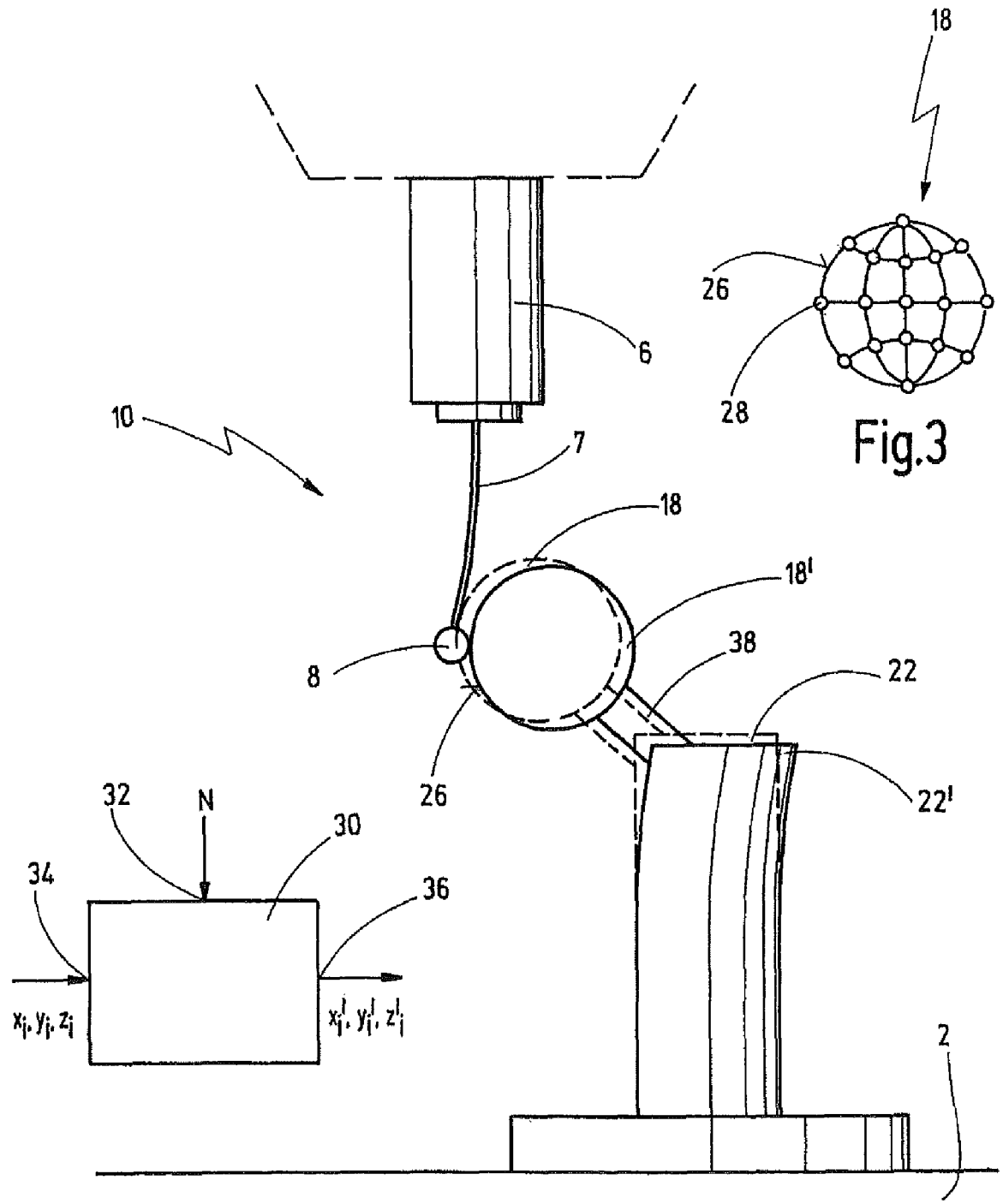

METHOD FOR CORRECTING THE MEASURED VALUES OF A COORDINATE MEASURING MACHINE, AND COORDINATE MEASURING MACHINE

CROSS REFERENCES TO RELATED APPLICATIONS

This application is a continuation of international patent application PCT/EP2008/007474 filed on Sep. 11, 2008 designating the U.S., which international patent application has been published in German language and claims priority from German patent application DE 10 2007 051 054.5 filed on Oct. 19, 2007. The entire contents of these priority applications are incorporated herein by reference.

BACKGROUND OF THE INVENTION

The invention relates to a method for correcting measured values of a coordinate measuring machine and a corresponding machine, and more particularly to a method for correcting measured values taking into account mechanical deformations occurring in the measurement process.

Coordinate measuring machines are often used to analyze the surface of workpieces. Systematic measurement errors may occur because elements and components of the coordinate measuring machine bend during the measurement operation. Mention is to be made here primarily of the bending of the probe head, in particular the probe pin, but also the bending of structural components of the coordinate measuring machine. Such bendings in the region of the probe head and the probe pin are essentially a result of the applied contact or measurement force. However, forces which occur when the moving elements of the coordinate measuring machine are accelerated or decelerated, in connection with their masses, may also play a role.

Bending of a coordinate measuring machine element involved in the measurement operation naturally leads to measurement errors. Attempts have therefore been made in a wide variety of ways to compensate for such measurement errors using correction methods.

It is known from DE 101 24 493 A1 to determine the dynamic bending behavior of a probe as a parameter field, in particular as a tensor, in order to calculate correction values from this parameter field while taking into account the acceleration acting on the probe, and finally to correct the measurement results of the probe using the correction values.

In coordinate measuring machines, it is furthermore known to calibrate the position of the probe sphere arranged on the free end of the probe tip of the probe head in space with the aid of so-called calibrating bodies. Conventionally, these calibrating bodies are configured as spheres which are arranged in the measurement region of the coordinate measuring machine and which can be approached by the probe sphere at almost any desired angles. In the scope of the present invention, the calibrating body is considered to be an element of the coordinate measuring machine.

It is known from DE 198 09 589 A1 to approach a calibrating body, in particular a calibrating sphere, with the probe head and guide the probe sphere along a path on the surface of the calibrating body, which is not restricted to a plane. The calibrating data assigned to the probe are calculated from the measured values recorded in this way.

Another disadvantage of known methods is that errors may also occur owing to the flexibility of the workpiece to be analyzed.

SUMMARY OF THE INVENTION

It is an object of the present invention to provide methods and devices in order to avoid these disadvantages. In particular, methods and a coordinate measuring machine are to be provided wherein a high measurement accuracy is obtained even if the workpieces and/or calibrating bodies suffer from mechanical deformations in the measurement process.

In view of the above, there is provided a method for correcting measured values of a coordinate measuring machine which has a probe head, a calibrating body and an apparatus for recording and correcting measured values, which are recorded by the probe head, on the basis of predetermined deformation parameters of elements of the coordinate measuring machine, the method comprising the steps of: determining a mechanical flexibility at predetermined points on the surface of the calibrating body; storing the mechanical flexibility in the apparatus in the form of a data record; scanning the calibrating body point by point by means of the probe head in order to obtain measured values; and calibrating the probe head by correcting the measured values of the probe head using the data record.

According to another aspect, there is provided method for correcting measured values of a coordinate measuring machine, which has a probe head and an apparatus for recording and correcting measured values, recorded by the probe head on a workpiece, on the basis of predetermined deformation parameters, the method comprising the steps of: providing a workpiece having a surface; determining a mechanical flexibility of the workpiece at predetermined points on the surface; storing the mechanical flexibility in the apparatus in the form of a data record; scanning the workpiece point by point by means of the probe head in order to obtain measured workpiece values; and correcting the measured workpiece values using the data record.

There is also provided a coordinate measuring machine comprising a base for receiving a workpiece, a probe head moveable relative to the base in order to obtain measured workpiece values, and an apparatus for recording and correcting said measured values, wherein the apparatus comprises a data record representing a mechanical flexibility of the workpiece.

It has now been found that the calibrating body, typically used for calibrating a coordinate measuring machine, and the calibrating body supports are deformed to an extent that is no longer acceptable in view of increased measurement accuracies. These deformations have not been taken into account up to now. However, they also result in errors for all further measurements which are carried out with the supposedly calibrated probe head.

With the new methods and machine, it is for the first time possible to compensate for those errors which occur owing to the deformation of the calibrating body. With the method mentioned second, correction or calibration is made possible for a known flexibility of the workpiece, so that this flexibility does either not lead to measurement errors.

In a preferred refinement, a calibrating sphere is used as the calibrating body.

This configuration has the advantage that known calibrating concepts can be employed.

The mechanical flexibility may advantageously be determined by measurement on a reference calibrating body or by the finite element method (FEM) on a model of the calibrating body.

It is preferred, if the mechanical flexibility at a point is computed together with the measured measurement force. It is also preferred if the surface of a workpiece is analyzed using the probe head and then the mechanical flexibility is subtracted from the measured values determined when analyzing the workpiece.

These preferred refinements have the advantage that the correction can be carried out in a simple way.

A particularly simple correction is obtained when the data record is stored in the form of a matrix.

Finally, a good effect is achieved when the calibrating body is arranged at the center of the available spatial measurement range. Deformations of structural components of the coordinate measuring machine, which depend on the measurement force, usually have their average values in this spatial region. Said refinement therefore has the advantage that these deformations are already taken into account in the calibration process. For example, when calibrating the probe pin flexibility, the component deformations are incorporated into the deformation parameters of the probe pin and can thus be partially compensated for in the measurement. Without correction of the flexibility of the calibrating body, on the other hand, in the past an attempt has been made to clamp the calibrating body as shortly as possible and therefore at the edge of the measurement region.

Further advantages may be found in the description and the appended drawing.

It is to be understood that all the features mentioned above and yet to be explained below may be used not only in the combination respectively indicated, but also in other combinations or individually, without departing from the scope of the present invention.

BRIEF DESCRIPTION OF THE DRAWINGS

Exemplary embodiments of the invention are represented in the drawing and will be explained in more detail in the following description.

FIG. 2 shows a side view of calibration on an enlarged scale to explain the methods according to the invention; and FIG. 3 shows a calibrating sphere with measurement points.

DESCRIPTION OF PREFERRED EMBODIMENTS

Figure 1:
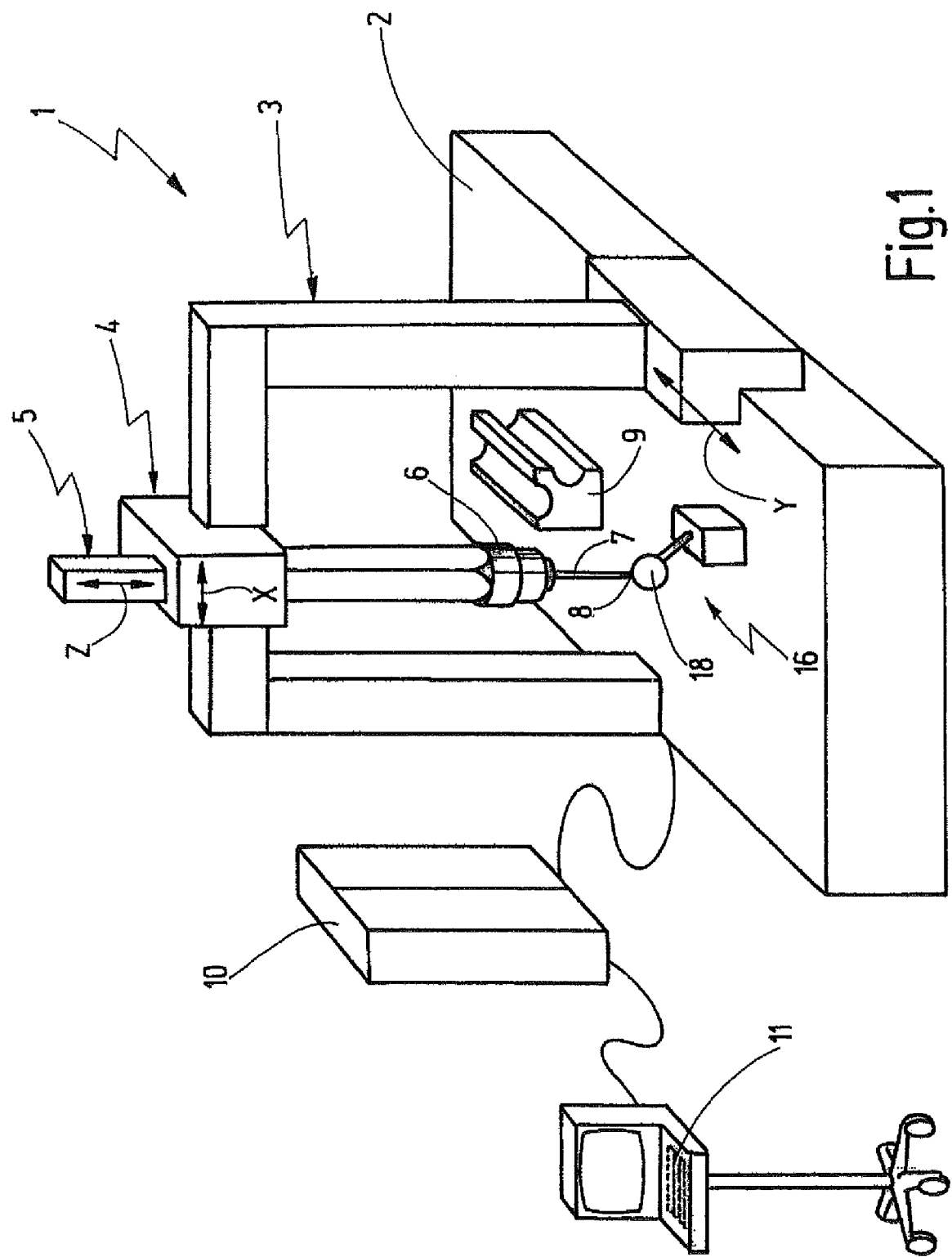
FIG. 1 shows a highly schematized perspective view of an embodiment of the new coordinate measuring machine.

In FIG. 1, 1 denotes a coordinate measuring machine of the well-known portal design type in its entirety. The coordinate measuring machine 1 has a measurement table 2, on which a portal 3 is arranged so that it can be displaced in the horizontal direction along the so-called y axis. On a bridge of the portal 3, a sleeve carrier runs in the horizontal direction along the so-called x axis. A sleeve 5 in turn runs in the sleeve carrier 4 in the vertical direction, the so-called z axis. The axes x, y and z form a cartesian coordinate system.

At the lower end of sleeve 5 is a probe head 6 which terminates in a probe pin 7, at the free end of which there is a probe sphere 8.

The probe head 6, and the probe pin 7, respectively, extend vertically downward in FIG. 1. The probe head 6 may conventionally be provided with a rotary articulation, so that it or the probe pin 7 can also be inclined relative to the vertical direction and/or rotated about the vertical direction. In this way, by displacing the portal 3, the sleeve carrier 4 and the sleeve 5, and by inclining and rotating the probe pin 7, it is possible to approach any desired point on a workpiece 9, which is clamped in a predetermined measurement space above the measurement table 2, from almost any desired direction.

The measured values determined by the probe head 6, that is to say the spatial coordinates of a measurement point on the workpiece 9, are transmitted to a control-measurement- and evaluation unit 10 which, in turn, can be controlled by a user using a control device 11 with a measurement and evaluation computer.

On the measurement table 2, preferably in the center of the measurement region, there is a calibrating device 16 which in the scope of the present invention is considered to be an element of the coordinate measuring machine 1, even though it is releasably connected to it.

The calibrating device 16 comprises a calibrating body of well defined shape, in particular a calibrating sphere 18. Since its position inside the measurement region is known, the probe head 6 can be calibrated. This is done by moving the probe sphere 8 against a defined point on the surface of the calibrating sphere 18, and comparing the spatial coordinates of this point thereby measured with the known actual spatial coordinates of the point. A resulting difference is taken into account in subsequent measurements on workpiece 9.

FIG. 2 shows the probing process of the calibrating sphere 18 on an enlarged scale. As may be seen from the (exaggeratedly represented) situation, the probe pin has bent to the left and the calibrating sphere has also bent from its starting position 18, denoted by dashes, into a displaced position 18'. At the same time, a support of the calibrating sphere has also bent from 22 to 22'. A surface 26 of the calibrating sphere 18 may also be deformed by the contact of the probe sphere 8. Overall, these bending processes are referred to as "flexibility" in the scope of the present invention.

As may be seen, the processes of the measurement force-dependent bending of the probe head 6, in particular the probe pin 7, cannot be separated from the deformation of the support 22 of the calibrating sphere 18 and of the calibrating sphere itself. Thus, if the procedure according to the prior art is adopted and this deformation is ignored, then a tensor which has been determined would contain not only the deformation of the probe pin 7 but also that of the calibrating sphere 18, and then all real workpieces, which are generally stiff, would be measured incorrectly.

According to the invention, the flexibility defined above is now initially determined in a first step. This may be done by a laboratory experiment with the aid of a real example of the calibrating sphere 18 and its support 22. As an alternative, the flexibility may also be calculated by means of the finite element method (FEM) with the aid of a corresponding model.

The flexibility is determined on the surface 26 of the calibrating sphere 18 at a multiplicity of points 28. These points are preferably distributed uniformly over the surface 26, as FIG. 3 shows by way of example. The number of points 28 may be set in wide ranges, depending on the size of the calibrating sphere 18 and depending on the desired accuracy.

The flexibility determined in this way is now stored as a data record in a second step. This is preferably done in the form of a matrix.

If for example a flexibility of 0.001 mm/N in the x and y directions and 0.0002 mm/N in the z direction has been determined in the laboratory experiment or by FEM calculation, then the following matrix is obtained for the flexibility:

$$N = \begin{pmatrix} 0.001 & 0.0 & 0.0 \\ 0.0 & 0.001 & 0.0 \\ 0.0 & 0.0 & 0.0002 \end{pmatrix}$$

In order to determine a correction value k' (x'i, y'i, z'i) for each point 28 on the surface 26, this matrix N is multiplied by the force vector F and the result is subtracted from the measured values k (xi, yi, zi) measured by the probe head 6:

$$k' = k - N \cdot f$$

The measured values corrected in this way allow the stiffness of the probe head 6 to be determined.

This is indicated in FIG. 2 by a correction stage 30. The matrix N is fed to a first input 32 of the correction stage 30. The measured values $x_i$, $y_i$ and $z_i$ of the probe head 6 are applied at a second input 34. The corrected measured values $x_i'$, $y_i'$ and $z_i'$ can be taken from an output 36 of the correction stage 30.

The force vector may be determined from various values, depending on the sensor used in the probe head system: for probe heads with an active measurement force generator, the force vector may be determined from the parameters of these generators, such as, for example, from the voltages applied to the measurement force coils in the case of measurement force coils being used as force generators. The measured values applied at the input 34 of the correction stage 30 may directly represent force values in this case.

For probe heads without such actuators, there are generally spring elements with a flexibility sufficiently known for these purposes. The measurement force may then be calculated from the sensor displacement and this known flexibility. The measured values applied to the input 34 of the correction stage 30 may in this case represent sensor displacements. The correction stage 30 in this case comprises calculation of the force vector from the displacements.

As an alternative, the correction stage 30 may also be supplemented with a further input for the force vector.

As a further alternative, finite resilient elements (not shown), which are respectively applied on the lower end of the calibrating sphere 18 and on a shaft 38 carrying the calibrating sphere 18, may also be employed in order to determine the flexibility. The elements then have a translation or rotation degree of freedom. Moments about these finite resilient elements may then be calculated from the measurement forces and from the position of the respective point 28. Each node may then be described by flexibility values for tilting by the effective moment, and for flexibility values displacement by the effective force.

With a corresponding method, which is likewise the subject-matter of the present invention, it is possible to correct the deformation of a workpiece 9, provided that its flexibility is known, during the actual measurement.

This is done by initially determining the mechanical flexibility at predetermined points on the surface of the workpiece 9. The flexibility determined is then stored in the form of a data record. When analyzing the workpiece 9, it is scanned point by point by means of the probe head 6 and the measurement values of the probe head 6, which have been determined, are corrected using the data record N.

What is claimed is:

1. A method for correcting measured values of a coordinate measuring machine which has a probe head, a calibrating body and an apparatus for recording and correcting measured values, which are recorded by the probe head, on the basis of predetermined deformation parameters of elements of the coordinate measuring machine, the method comprising the steps of:
   determining a mechanical flexibility at predetermined points on the surface of the calibrating body;
   storing the mechanical flexibility in the apparatus in the form of a data record;
   scanning the calibrating body point by point by means of the probe head in order to obtain measured values; and
   calibrating the probe head by correcting the measured values of the probe head using the data record.

2. The method of claim 1, wherein the calibrating body comprises a calibrating sphere.

3. The method of claim 1, wherein the mechanical flexibility at the predetermined points on the surface of the calibrating body is determined by a measurement on a reference calibrating body.

4. The method of claim 1, wherein the mechanical flexibility at the predetermined points on the surface of the calibrating body is determined by a numerical process applied to a mathematical model of the calibrating body.

5. The method of claim 4, wherein the numerical process is a finite element method.

6. The method of claim 1, wherein a measurement force is determined, the measurement force representing a contact force on the calibrating body during the scanning step, and wherein the mechanical flexibility is determined in dependence of the measurement force.

7. The method of claim 1, further comprising the steps of:
   providing a workpiece;
   scanning the workpiece point by point by means of the probe head in order to obtain workpiece measurement values; and
   subtracting the mechanical flexibility from the workpiece measurement values.

8. The method of claim 1, wherein the data record is stored in the form of a matrix in the apparatus.

9. The method of claim 1, wherein the coordinate measuring machine has a defined measurement range having a center, and wherein the calibrating body is arranged substantially at the center.

10. A method for correcting measured values of a coordinate measuring machine, which has a probe head and an apparatus for recording and correcting measured values, recorded by the probe head on a workpiece, on the basis of predetermined deformation parameters, the method comprising the steps of:
   providing a workpiece having a surface;
   determining a mechanical flexibility of the workpiece at predetermined points on the surface;
   storing the mechanical flexibility in the apparatus in the form of a data record;
   scanning the workpiece point by point by means of the probe head in order to obtain measured workpiece values; and
   correcting the measured workpiece values using the data record.

* * * * *